Nov. 17, 1970    V. G. SHULTS    3,541,572
CODING THEODOLITE

Filed Feb. 21, 1968    6 Sheets-Sheet 1

Nov. 17, 1970

V. G. SHULTS 3,541,572

CODING THEODOLITE

Filed Feb. 21, 1968

Nov. 17, 1970  V. G. SHULTS  3,541,572
CODING THEODOLITE

Filed Feb. 21, 1968  6 Sheets-Sheet 6

United States Patent Office 3,541,572
Patented Nov. 17, 1970

3,541,572
CODING THEODOLITE
Voldemar Garrievich Shults, Nalichnaya ulitsa 37,
korpus 3, kv. 13, Leningrad, U.S.S.R.
Filed Feb. 21, 1968, Ser. No. 707,089
Int. Cl. G01c *1/04;* G01d *5/32*
U.S. Cl. 346—2
2 Claims

ABSTRACT OF THE DISCLOSURE

A coding theodolite for automatic recording of the values of measurments of horizontal and vertical angles wherein as horizontal and vertical circles there are employed code discs in the form of round transparent plates having code masks thereon consisting of two concentrical graduation line tracks. The graduation lines are arranged radially. The number of the first and second code tracks is in the following relation:

$$\alpha = \beta + \frac{\beta}{n_1} = \beta\left(1 + \frac{1}{n_1}\right)$$

where
$\alpha$ represents the angular interval of the second code track;
$\beta$ is the angular interval of the first code track;
$n_1$ is a number of graduation lines on the first code track.

The measurement results are fixed on the frame of the film in the form of two graduation lines whose mutual position with respect to each other and with reference to the readout line for which one of the borders of the film frame may be taken, contains the information about the angular value to be measured. To obtain the angular value to be measured in digital form, the film with the results of measurements is treated additionally in a special film readout apparatus.

---

This invention relates to geodetic instruments and more particularly to coding theodolites which are capable of automatically recording the quantities being measured and are utilized in taking measurements involved in geodetic surveys and mining practice.

Now in use are coding theodolies capable of automatically recording the values being measured, said theodolites being featured by the fact that when measuring horizontal and vrtical angles, the images of the portions of the code disks of the transducers that correspond to the value of the angle being measured, are projected through at least one slit diaphragm onto the photographic film of a photoregister, said transducers being capable of converting the values of the horizontal and vertical angles into a code.

The prior coding theodolites employ code disks whose masks are essentially combinations of transparent and opaque strips different in width and spaced around the concentric peripheries of said disk. The manufacture of said code disks involves special automatic indexing machines. Moreover, the cost of such machines is so high that the employment thereof can be justfied only in the case where theodolites of higher and precision accuracy are involved.

It is an object of the present invention to provide a coding theodolite simple in design and featuring low-cost manufacture.

It is another object of the present invention to provide a coding theodolite which is suitable for use in geodetic surveys and engineering work of increased and commerical grade of accuracy.

In keeping with the abovesaid and other objects, in the coding theodolite according to the present invention, the code mask of each of the code disks of the transducers capable of converting the values of the horizontal and vertical angles into a code, is essentially two code tracks, whereon graduation lines are provided, spaced equidistantly on said tracks, some of these located on the first code track, carrying information on an exact position of the sight line within the limits of said angular distances, whereas the other of said lines located on the second code track, carry information on the ordinal number of the neighboring graduation line provided on the first code track, the value of the angular distance of the second code track exceeding that of the first code track by a value inversely proportional to the value of the angular distance of the first code track.

With a view to expressing information contained within the angular distances between the graduation lines of both code tracks, it is expedient that provision be made in the focal plane of the photoregister of the digital code, for a screen with a code mask having at least one code track which is constituted by alternating transparent and opaque strips, the number of which is equal to or exceeds that of the graduation lines of the first code track.

Such a design principle of the coding theodolite makes it possible to extend the field of application of such theodolies in taking measurements involved in geodetic surveys and mining practice.

Other objects and advantages of the present invention will be apparent from a consideration of a description of an exemplary embodiment thereof to be had in conjunction with the accompanying drawing, wherein:

FIGS. 3b and 3c show portions of the mask of 3a;

Figure 1:
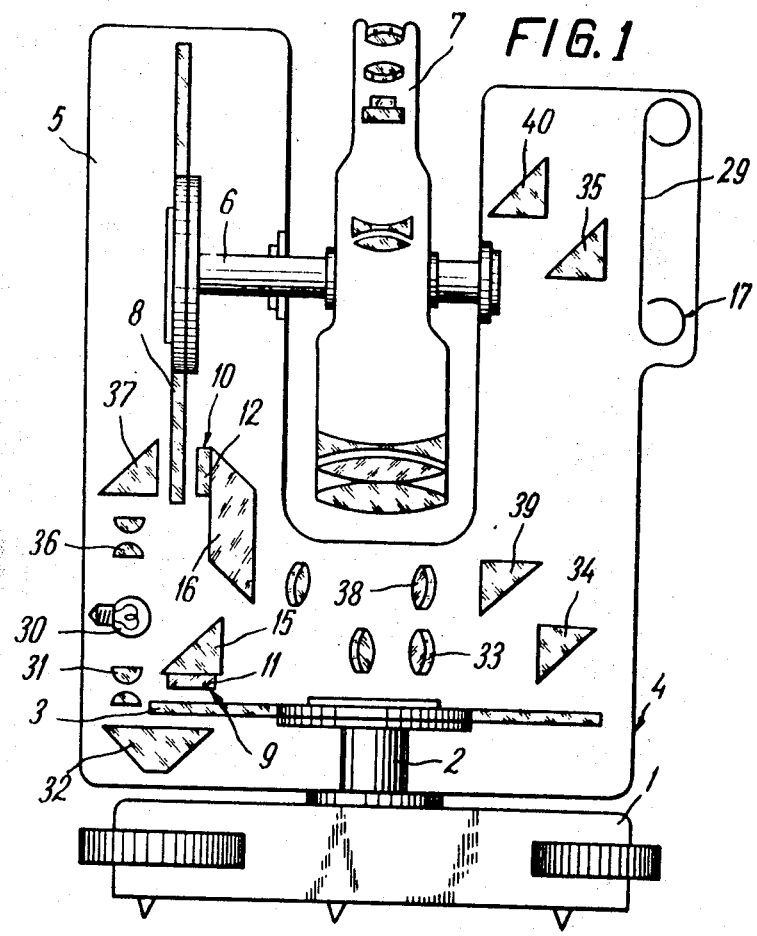
FIG. 1 is a general diagrammatic view of the theodolite according to the invention, taken in axial section.

Now referring to FIG. 1, the coding theodolite according to the invention comprises a carrier 1 on whose axle 2 a horizontal limb 3 is fixed in position. A movable portion 4 of the theodolite is secured to the said axle 2 which at the same time serves as the vertical axis thereof, said movable portion 4 incorporating a casing 5 with an axle 6 which is essentially the horizontal axis of the theodolite, both a telescope 7 and a vertical limb 8 being fixed in position on said axle. The latter axle is at the same time the rotational axis of the telescope 7. The casing 5 accommodates a transducer 9 capable of converting the values of the horizontal angles into a code, as well as a transducer 10 capable of converting the values of the vertical angles into a code.

Each of the transducers 9 and 10 comprises diaphragms 11 and 12 respectively featuring slit apertures 13 and 14 (FIG. 2), said diaphragms being made fast on prisms 15 and 16 (FIG. 1), both the horizontal limb 3 and the vertical limb 8 serving as code disks for said transducers, and a photoregister 17. Each of the code discs 3 and 8 is a round transparent plate on which a code mask 18 is placed.

Each of the code masks 18 (FIG. 2) of the code disks is essentially two code tracks 19 and 20, said tracks bearing respective graduation lines 21 and 22 provided at an equal angular distance, specific for each of said tracks.

Figure 3:
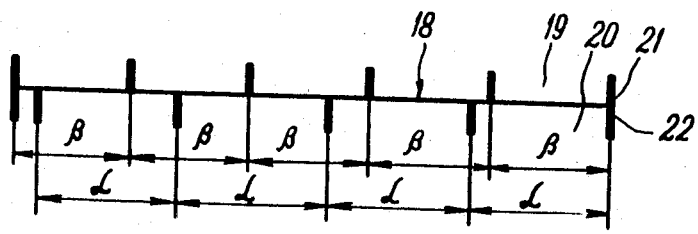
FIG. 3 is a plan view of a portion of the code mask of the theodolite disclosed herein.

The graduation lines 21 carry information on the true position of the sight line within the limits of said angular distances, whereas the graduation lines 22 carry information on the ordinal number of the neighboring line 21. The value of the angular distance $\alpha$ (FIG. 3) between the graduation line 22 exceeds the value of the angular distance $\beta$ between the graduation line 21 by a value inversely proportional to the value $\beta$, i.e.

$$\alpha = \beta + \frac{\beta}{n_i} = \beta\left(1 + \frac{1}{n_i}\right)$$

where $n_i$ stands for the total number of the graduation lines 21.

In the second embodiment of the theodolite, provision is made for a screen 23 (FIG. 4) mounted additionally in the focal plane of the photoregister 17, said screen featuring a multiple-order code mask 24, provided with a binary code which is essentially a combination of transparent and opaque strips, said code being capable of defining unambiguously, as a digit code, the position of the graduation lines 21 and 22 projected onto the code mask 24. These strips of a code track 25 of the lower order of the mask 24 exceed in number the sum total of the graduation lines 21.

According to the third embodiment of the theodolite, the diaphragms 11 and 12 are substituted for a single diaphragm 26 (FIG. 5) with a slit aperture 27, which diaphragm is mounted in the focal plane of the photoregister 17 and is utilized by both of the transducers 9 and 10. The screen 23 provided with a single code track 28 is mounted in the field of view of the aforesaid diaphragm 26, said track 28 being essentially the transparent and opaque strips arranged alternatively, whose number exceeds the total number of the graduation lines 21.

In a particular example, if the number of graduation lines 21 (FIG. 3) on the graduation line trace is $n_i = 400$, then the angular interval between two neighboring graduation lines on this track is $\beta = 1^g$.

The angular interval between two neighboring graduation lines 22 on the graduation line track 20 is:

$$\alpha = \beta + \frac{\beta}{n_i} = 1^g + \frac{1^g}{400} = 1^g 25^{cc}$$

Figure 2:
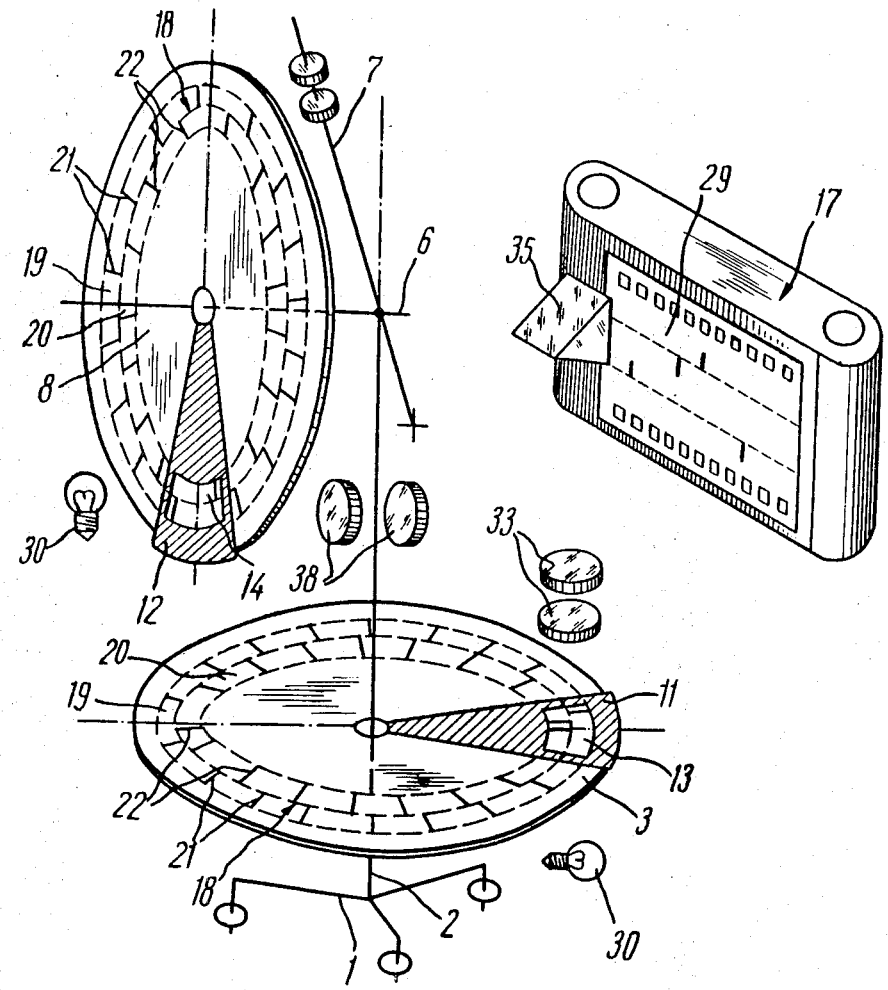
FIG. 2 is an optical system of the first embodiment of the theodolite represented in FIG. 1.

The first graduation lines of each of the tracks ensuring the zero reading are arranged, over each other in the radial direction. When proceeding away from the zero reading, the distance between the graduation lines having the same ordinal number (with respect to the zero reading) rises through multiple discrete intervals l=25cc. The results of measurements taken from the scales are recorded by means of optical systems projecting these portions of the scales onto the plane of the film through the aperture 13 or 14 (FIG. 2), diaphragm 11 or 12 (FIG. 2) whose width is equal or a little bit more than the angular interval $\beta$. The aperture of the diaphragm 11 and 12 (FIG. 2) is arranged on one of the focal planes of the photoregister 17 (FIG. 2).

The value to be measured consists of two readings: in grades and seconds. The decoding is carried out after the development of the film. The reading value in grades is determined by the distance between two nearest graduation lines of both tracks multiplied by a respective scale factor due to the position and with respect to the readout line. The value of the reading in seconds is determined by the distance from the graduation line 21 of the graduation line track 19 (FIG. 3) up to the readout line for which may be taken e.g. one of the lateral borders of the apertures of the diaphragm which is also multiplied by a respective scale factor.

To obtain the values to be measured directly in the form of the digital code in one version of the frame of the theodolite in the focal plane of the photoregister there is installed the screen 23 (FIG. 4) with the multi-order code mask 24 for example with a binary code. In this case the values of the positions of the graduation lines 21 and 22 (FIG. 4a) are read from the code mask 24 in the plane of the frame in the form of the digital code whose further treatment separates the angular value to be measured.

To simplify the embodiment of the coding theodolite, the focal plane of the photoregister 17 (FIG. 5) accommodates the screen 23 (FIG. 5) with the single order code track 28 consisting of a combination of transparent and opaque strips equal in width. In this case the forward border of the first element of the code track (28) (FIG. 5) is taken for the readout line. The digital value of the reading in seconds is determined by the quantity of elements arranged from the beginning of the reading and to the element being in front of the graduation line 21 which is multiplied by a respective scale factor.

Figure 5A:
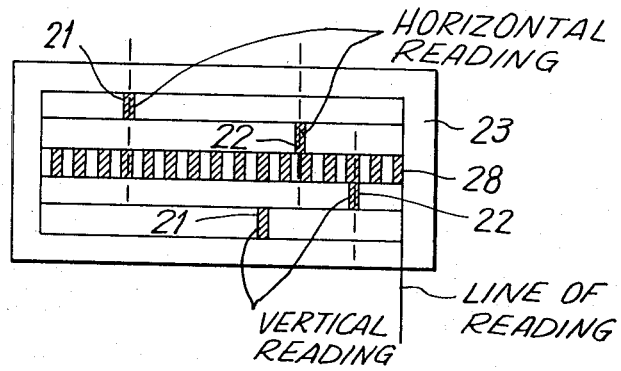
FIG. 5a is a plan view of the code track of the photoregister screen.
Figure 5:
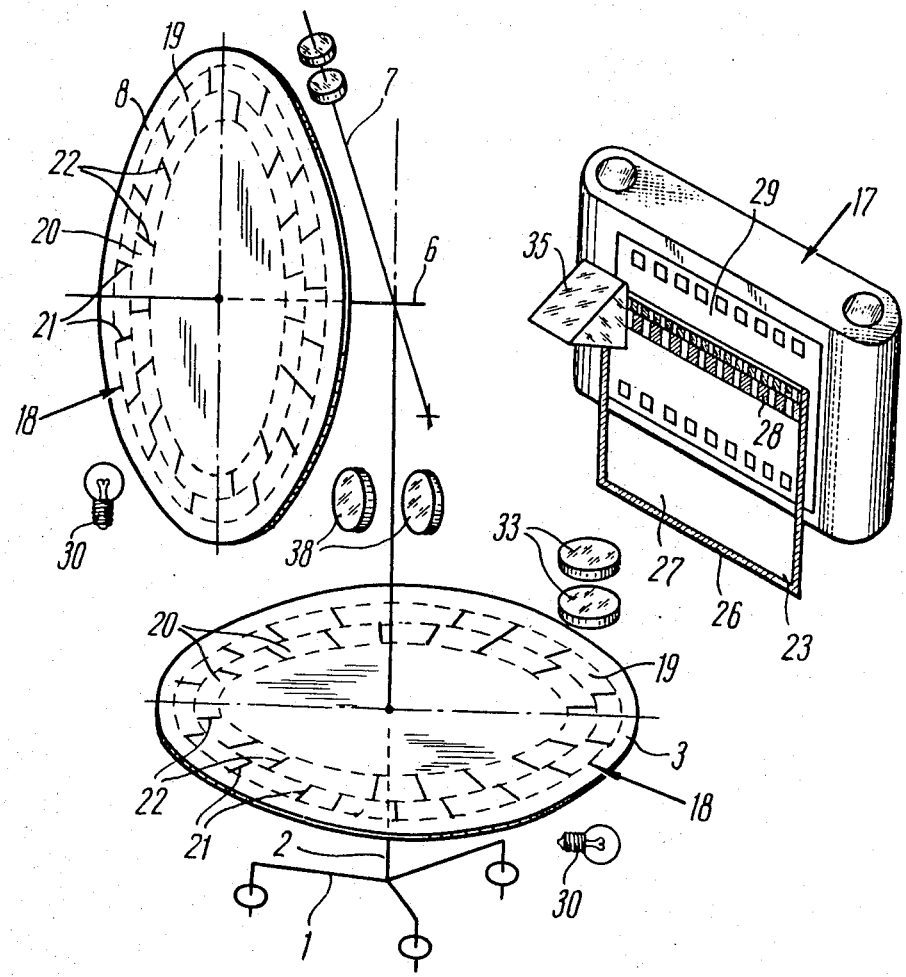
FIG. 5 is an optional system of the third embodiment of the same theodolite.

The reading in grades is determined by the quantity of elements between the graduation lines 21 and 22 (FIG. 5). To obtain the digital value of the results of measurements the numerical value of the quantity of elements is multiplied by a respective scale factor. Due to the order of the position of the graduation lines 21 and 22 with respect to the readout line on the frame of film a correction factor is introduced into the reading.

The operating principle of the coding theodolite accoding to the invention, is as follows.

Prior to taking measurements, the amount of photographic film 29 (FIG. 1) adapted for the purpose is to be checked by making use of the frame counter. By means of the adjustment screws of the carrier 1 the theodolite is to be levelled strictly. Then the telescope 7 is aimed at the first collimating point, whereupon an illuminator 30 is switched on which illuminates a portion of the code mask 18 of the limb 3 through a condenser lens 31 and a prism 32. The image of the portion of the code mask 18 is projected onto the photographic film 29 through the slit aperture 13 of the diaphragm 11 by virtue of the optical system of the photoregister 17 which comprises the prism 12, an objective lens 33, prisms 34 and 35, so that the film becomes exposed with the images of the graduation lines 21 and 22 which are in the field of view of the slit 13 when taking the measurements. The results of measurement in the horizontal plane are determined by the position of the graduation lines 21 and 22 in the field of view of the slit aperture 13. The measuring procedure can be assumed as the results of coarse and fine measurements. The value of the fine measurement is determined by the position of the graduation line 21 with respect to the edge of the slit aperture 13 used as an origin of reading, whereas the value of the coarse measurement is determined as the distance between two neighboring graduation lines 21 and 2. Then the telescope 7 is aimed at the second collimating point, whereupon the illuminator 30 is switched on and the film 29 becomes exposed to receive the results of the second measuring procedure in full conformity with the aforementioned procedure for the first collimating point. The result of measurement represented as a digitial code is obtained after the photographic film 29 carrying the results of measurement has been processed on a read-out filmstrip unit.

The value of the angle between the first and second collimating points is determined as the difference between the results of measurement performed when aiming at both of said collimating points.

The measurements in the vertical plane are carried out in a similar manner to that described hereinabove by making use of the illuminator 30, the condenser lens 36, the prism 37, the vertical limb 8, the diaphragm 12 with the slit aperture 14, the prism 16, the objective lens 38, the prisms 39 and 40 and the photographic film 29.

The operating principle of the present theodolite according to the second embodiment of the invention is analogous to that of the first embodiment thereof, the only difference residing in that the results of measurements of the angles $\varphi$ represented as a digtal code, are taken directly from the code mask 24, said results of measurements being obtainable from the formula below:

$$\varphi = \Delta_2 \cdot \beta + (\alpha - \beta) \cdot \Delta_1$$

where $\alpha$ is the numerical value of the code mask 24, the numerals expressing said value being located against the image of the graduation line 22;

$\Delta_1$ stands for the intercept of the code track 20;

$\beta$ denotes the numerical value of the code mask 24, the numerals expressing said value being located against the image of the graduation line 21;

$\Delta_2$ designates the intercept of the code track 19.

The operating principle of the present theodolite according to the third embodiment of the invention, is analogous to those of the first and second embodiments thereof, the only difference being that one diaphragm 26 is used whose slit aperture 27 is common to both of the transducers 9 and 10, a code track 28 being located in the field of view of the slit aperture 27, said track being photographed concurrently with the graduation lines 21 and 22 so that the images of said track and said graduation lines are arranged close to each other on the same photogrphic film 29. It is due to the provision of the code track 28 that decoding of the results of measurements of the angles involved is substantially simplified.

The results of measurements of the angles $\varphi$ represented as a digital code for the theodolite according to the abovesaid embodiment of the present invention, can be obtained from the formula below:

$$\varphi = \Delta_1 \cdot n_1 + \Delta_2 \cdot n_2$$

where:

$n_1$ is the number of strips provided on the code track 28 appearing on the photographic film 29, depending upon the beginning of the code track and the position of the image of the graduation line 21;

$\Delta_1$ stands for the intercept of the code track 28 for the fine measurement which depends upon the code track 19;

$n_2$ denotes the number of strips provided on the code track 28 appearing on the photographic film 29, depending upon the distance confined to the position of the images of the graduation lines 21 and 22;

$\Delta_2$ designates the intercept of the code track 28 for the coarse measurement, depending upon the code track 20.

Figure 3A:
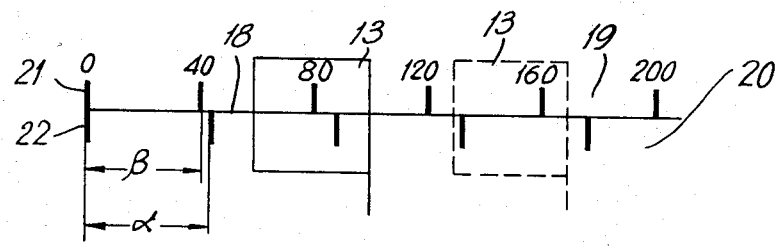
FIG. 3a shows a plan view of a portion of a particular embodiment of the code mask of the theodolite.
Figure 3B:
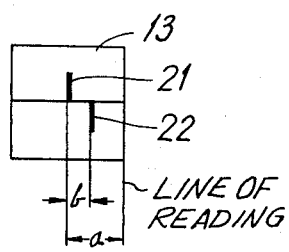
Figure 3C:
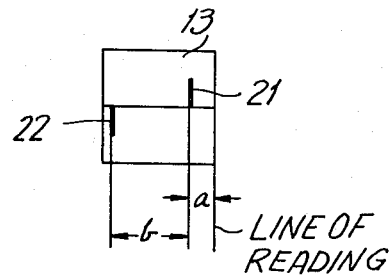

To give a more detailed explanation of how the present code theodolite performs the recording of the values to be measured and their subsequent decoding into the decimal system of presentation, FIGS. 3a, 3b and 3c show an embodiment of the code mask 18 (plan view) and two of the possible positions of the aperture 13 with respect to this code mask (positions I and II in FIG. 3a), as well as a view of the frame of film with results of measurements corresponding to these positions (FIGS. 3b and 3c). To explain the operation of the coding theodolite, FIG 3a is provided with numerals of graduation lines 21 which are absent from the coding discs used in the present coding theodolite.

FIG. 3b shows a frame of film corresponding to the angular value to be measured at one of the possible positions of the coding theodolite (position I in FIG. 3a). In the aperture 11 (FIGS. 3a and 3b) there are graduation lines 21 and 22 whose position with respect to each other as well as with respect to the readout line for which the right border of the aperture 11 is taken, contains the data about the value to be measured.

The value to be measured consists of two readings: in grades and in seconds. Hereinafter will be analysed only the version of the coding theodolite with the reading grade system.

The grade reading is determined by the position of graduation lines 21 and 22 with respect to each other and by their position with respect to the readout line. The reading in seconds is determined by the position of the graduation line 21 with respect to the right-hand border of the aperture 11 which is taken as the readout line.

Upon the development of the film with results of measurement the latter may be decoded and presented in the decimal system of presentation. At decoding the results of measurements fixed on the frame of film in monitoring the value of the grade reading the successive positions of graduation lines 21 and 22 are taken into account with respect to the readout line. FIG. 3b shows a case when the graduation line 21 is at a greater distance from the readout line than the graduation line 22.

For this case the full value of reading N is determined by the formula:

$$N = A + B$$

where $A = m_{cc} \cdot a$ is a value of reading in seconds;

$B = m_g \cdot b$ is a value of reading in grades;

$a$ is the distance between the graduation line 21 and the readout line (FIG. 3b);

$m_{cc}$ is a scale factor for the reading in seconds;

$b$ is the distance between the graduation lines 21 and 22 (FIG. 3b);

$m_g$ is a scale factor for reading in grades.

FIG 3c shows a case when the graduation line 21 is at a smaller distance from the readout line than the graduation line 22.

For this case the full value of the reading N is determined by the formula:

$$N = A + [B]$$

where $A = m_{cc} \cdot a$ is the value of the reading in seconds;

$$[B] = m_g \cdot \left( l - b + \frac{1}{n_1} \right) = m_g \cdot \left[ l \cdot \left( 1 + n_1 \right) - b \right]$$

where $l$ is a distance between two neighboring graduation lines 21 (FIG. 2) converted to the frame on the film;

$n_1$ stands for the number of the graduation lines 21 on the track 19 (FIG. 2).

Hereinafter will be analyzed an example for decoding the information with reference to the case shown in FIG. 3a for two positions I and II (FIGS. 3b and 3c).

For this case we have:

$n_1 = 10$
$m_g = 10$ g./mm.
$m_{cc} = 20,000$ cc./mm.

In FIG. 3b we have:

$b = 4$ mm.
$a = 10$ mm.

The full value of the magnitude to be measured is determined by the formula:

$N = A + B = m_{cc} \cdot a + m_g \cdot b = 20,000$ cc./mm. $\cdot 10 + 20$ g./mm. $\cdot 4$ mm. $= 80^g + 200,000^{cc} = 100^g$ In FIG. 3c we have:

$b = 14$ mm.
$a = 5$ mm.
$l = 20$ mm.
$n_1 = 10$
$m_g = 20$ g./m.
$m_{cc} = 20,000$ cc./mm.

The full value of the magnitude to be measured is determined by the formula:

$$N = A + [B] = m_{cc} \cdot a + m_g \left[ 1 + \frac{1}{10} \right) - b \right]$$

$$= 20,000 \text{ cc./mm.} \cdot 5 \text{ mm.} + 20 \text{ g./mm.} \cdot /20 \text{ mm.} \left( 1 + \frac{1}{10} \right)$$

$$- 14 \text{ mm.}/ = 100,000^{cc} + 20 \text{ g/mm} \cdot 8 \text{ mm.} = 170^g$$

The example cited as above confirms that the reading in grades determines the numerals of the graduation line 21 (FIG. 3a).

Note: In the example in FIG. 3 the reading in seconds has the scale factor $m_{cc} = 20,000$ cc./mm., i.e. $m_{cc} = 2$ g./mm. However the reading is taken in grade seconds to approach the example to the actual data. In the present coding theodolite wherein $n_1 = 400$, the diameter of the code disc $D = 100$ mm. and size of the frame on the film with information about the results of measurements equal to 16 x 16 mm., the scale factors have respectively the following values:

$$m_g = 25 \text{ g./mm.}$$
$$m_{cc} = 625 \text{ cc./mm.}$$

The operation for decoding the results of measurements carried out with the coding theodolite is performed on a special apparatus for reading the films which is outside the scope of this invention.

Figure 4:
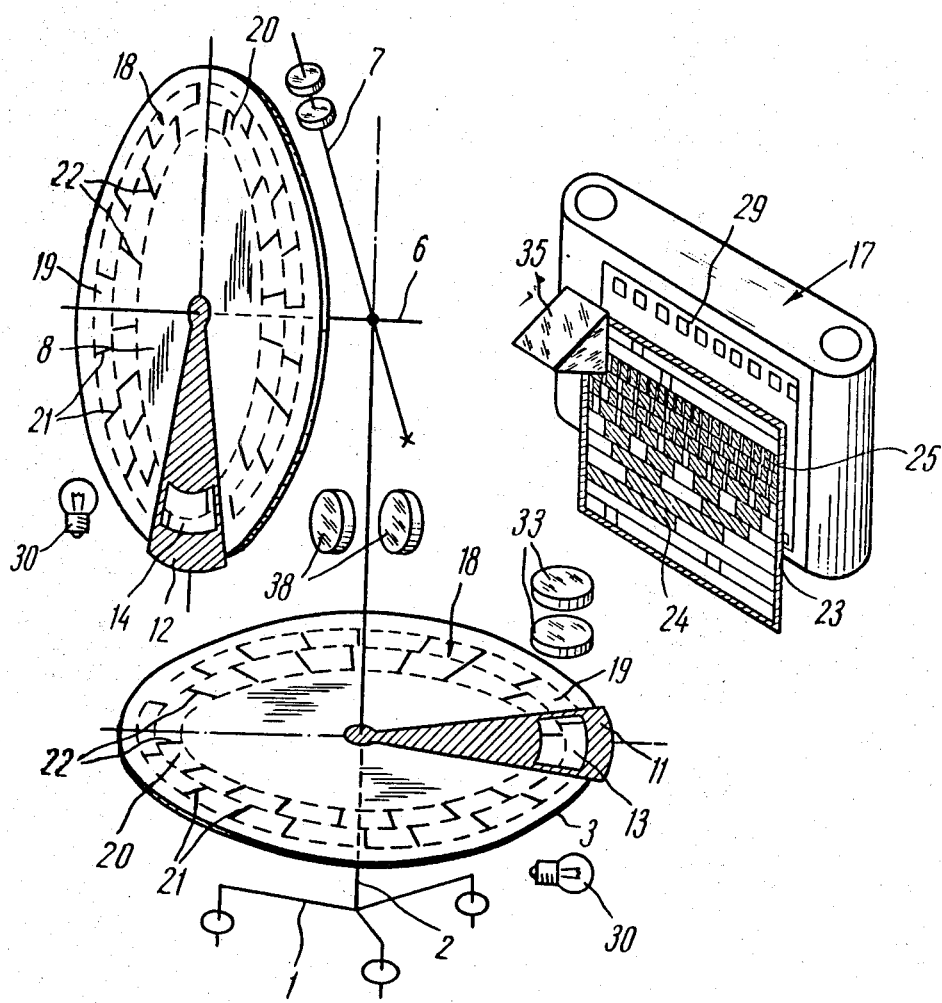
FIG. 4 is an optical system of the second embodiment of the theodolite in contemplation.

As shown hereinabove, the results of measurements in the coding theodolite are determined by the position of the graduation lines 21 and 22 with respect to each other and with reference to the readout line for which one of the lateral boarder of the aperture 11 of the diagram 13 (FIG. 2) is taken. To express the value to be measured in the binary code convenient for the direct input into the digital computer, the distances $a$ and $b$ (FIGS. 3b and 3c) should be measured and the obtained values of the distances are converted into the required binary code. This operation is carried out automatically in the film readout apparatus. However, this operation requires a frame-by-frame displacement of the film with the results of measurements. To simplify the decoding of the results of measurements carried out by the coding theodolite the film readout apparatus in the present coding theodolite accommodates in one of the focal planes of photoregister the screen 23 with the code mask 24 (FIG. 4). The longitudinal size of the code mark 24 is equal to that distance, converted to said mask, between two neighboring graduation lines 21 (FIG. 2). On the screen 23 there are projected through the aperture 11 of the diaphragm 13 (FIG. 4) a part of the code disc 3, whose two graduation lines 21 and 22 contain the information about the value to be measured. These graduation lines are projected together with the code mask 24. To express in the binary code the positions of the graduation lines 21 and 22 within the range of a frame of the film with respect to the readout line the value of the code mask being in front of the respective graduation line should be determined in the binary code.

Figure 4A:
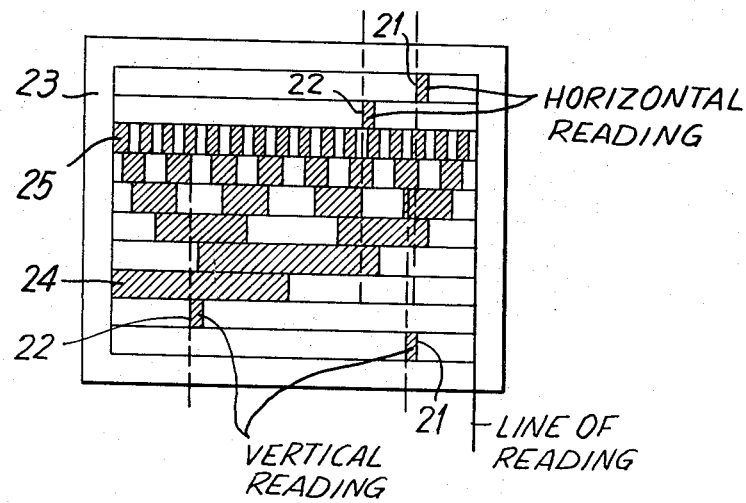
FIG. 4a is a plan view of the screen of the photoregister.

FIG. 4a is intended to show the purpose of the code mask 24. For the horizontal reading, the value of the position of the graduation line 21 is determined by the number 111100 in the binary code meanwhile the value of the position of the graduation line 22 is expressed by the number 011110 in the same binary code. For the vertical reading the value of the position of the graduation line 21 is determined by the number 011100 in the binary code meanwhile the value of the position of the graduation line 22 is expressed by the number 110101 in the binary code.

In determining the reading in grades and seconds in this version for the readout line there is taken the border of the code mask 24 having zero value reading in the binary code.

In another version of the present coding theodolite whose diagram is shown in FIG. 5, instead of the multi-order code mask 24 (FIG. 4) there is applied the single-order code track 28 (FIG. 5) being a combination of transparent and opaque strips equal by their width. The size of the code track 28 (FIG. 5) is equal to the distance between two neighboring lines 21 (FIG. 2) converted to the screen 23. For decoding the results of measurements carried out with the coding theodolite and fixed on the frame of film in the form of two graduation lines 21 and 22 (FIG. 5) in the present embodiment of the coding theodolite, care should be taken to count the quantity of the elements transparent as well as opaque being between the graduation lines 21 and 22 as well as from the beginning of the code track used as a readout line up to the graduation line 21. When a pulse binary counter is used to count the cited elements, the positions of the graduation lines 21 and 22 are taken in the form of the digital binary code.

Moreover the data treated in the digital computer or directly in the film readout apparatus determines the digital value of the angular magnitude measured by the coding theodolite.

FIG. 5a shows the purpose of the single-order code track 28. The digital value of the grade reading A is determined by the formula:

$$A = m_g \cdot k$$

since the graduation line 21 is at the larger distance from the readout line than the graduation line 22 (FIG. 5a), where $m_g$ stands for the scale factor of the reading in grades $k$ is a quantity of elements of the track 28 (FIG. 5a) arranged between the graduation lines 21 and 22.

For the example cited in FIG. 5a at $m_g = 1$ g./element we have $$A = 1 \cdot 14 = 14^g$$

the reading in seconds B is: when $m_{cc} = 10$ cc./element (scale factor of the reading in seconds)

$$B = m_{cc} \cdot k = 10^{cc} \cdot 24 = 240^{cc} = 2^c 40^{cc}$$

i.e. the full digital value of the horizontal reading is:

$$N = A + B = 14^g + 2^c 40^{cc} = 14^g 2^c 40^{cc}$$

The digital value of the vertical reading in grades A is determined by the formula:

$$N = (n + 1 - k) \cdot m_g$$

since the graduation lines 21 is at the less distance from the readout line than the graduation line 22 (FIG. 5), where $n$ stands for the number of elements on the track 28.

For the example cited in FIG. 5a when $m_g = 1$ g./element we have:

$$A = (32 + 1 - 8) \cdot 1 = 5^g$$

For the example cited in FIG. 5a when $m_{cc} = 10$ cc./element we have:

$$B = 10 \cdot 12 = 120^{cc} = 1^c 20^{cc}$$

Thus, the total value of the vertical reading for the example cited in FIG. 5a is:

$$N = A + B = 5^g + 1^c 20^{cc} = 5^g 1^c 20^{cc}$$

The screen 23 used in the present coding theodolite with the multi-order code mask 24 (FIG. 4) or single-order code track 28 (FIG. 5) besides the specified objects has also the advantage that substantially reduces the influence of the film deformation upon the accuracy of measurements. In said embodiments of the coding theodolite, the variation of the distance between the graduation lines 21 and 22 as well as between the graduation line 21 and the readout line due to the film deformation does not introduce a considerable error into the results of measurements since the sizes of the code mask 24 (FIG. 4a) or the code track 28 (FIG. 5a) are varied almost by the same value simultaneously The coding theodolite according to the invention features substantially reduced weight and cost as compared to the conventional coding theodolites of the prior art. The code disks for said theodolite are manufactured on indexing machines of conventional design employed in producing the limbs of optical-scale theodolites. The cost of the code disks employed in the herein disclosed coding theodolite is not in excess of that of the limbs of the optical-scale theodolite.

The coding theodolites according to the invention can be made of high precision accuracy.

Though this invention has been described herein with reference to the preferable embodiment, it will be understood that minor changes in the details construction may be made without departing from the spirit and scope of the invention, as will be readily understood by those competent in the trade.

What is claimed is:

1. A coding theodolite for automatic recording of the values to be measured, said theodolite comprising: a carrier having an axis; a casing rotatably inserted with respect to the axis of said carrier, the latter serving as a base for said casing; a vertical axle on said casing; a horizontal axle on said casing; a telescope installed rigidly on said horizontal axle serving as a rotational axis for said telescope; a horizontal angle transducer code disc constituted as a round transparent plate installed rigidly on said vertical axle; a vertical angle transducer code disc constituted as a round transparent plate installed rigidly on said horizontal axle; code masks arranged on each of said discs respectively and each being constituted as first and second concentric code tracks consisting of radial graduation lines arranged in equal angular intervals for each of the code tracks in such a way that at the zero reading value the graduation lines of the first and second code tracks are arranged exactly in a radial direction to each other and by moving away from said position of the zero reading the distance between the graduation lines of both tracks having the same ordinal number with respect to the zero reading being increased in discrete intervals multiple to the relation of the first concentrical track divisor circle length to the square of the number designating the amount of the graduation lines on said track whereby permitting determination of the position of the sight line within the range of the angular interval of the first code track and ordinal number of said angular interval of the first code track for fixing the successive angular position; an optical means, having focal planes, for transmitting the image of said code masks graduation lines corresponding to the angular positions; at least one diaphragm having an aperture and installed in one of the focal planes of said optical means for transmitting the images of graduation lines of the code masks; and a photoregister, having a focal plane, for fixing the images of the graduation lines of said code masks corresponding to those projected by said optical means through said aperture.

2. A coding theodolite as claimed in claim 1 comprising a screen in the focal plane of said photoregister with a code mask having at least one code track which is a combination of sequentially alternating transparent and opaque strips whose total is at least equal to that of said graduation lines of the first code track of one of said code discs for expressing the information about the values of horizontal and vertical angles to be measured in a digital code contained in the mutual position of graduation lines of the first and second code tracks and their position with respect to the readout line.

References Cited

UNITED STATES PATENTS

| | | | |
|---|---|---|---|
| 2,111,516 | 3/1938 | Roux | 346—107 X |
| 2,893,123 | 7/1959 | Bach et al. | 346—107 X |
| 3,099,090 | 7/1963 | Frisch | 33—46 |
| 3,167,756 | 1/1965 | Rachwal et al. | 340—347 |
| 3,200,696 | 8/1965 | Lang et al. | 33—1 X |

JOSEPH W. HARTARY, Primary Examiner

U.S. Cl. X.R.

33—1; 340—347